United States Patent Office 3,098,824
Patented July 23, 1963

3,098,824
LUBRICATING COMPOSITION
Allen F. Millikan, Crystal Lake, and Gifford W. Crosby, River Forest, Ill., assignors to The Pure Oil Company, Chicago, Ill., a corporation of Ohio
No Drawing. Original application Nov. 15, 1957, Ser. No. 696,604, now Patent No. 2,996,532, dated Aug. 15, 1961. Divided and this application Aug. 24, 1960, Ser. No. 51,494
22 Claims. (Cl. 252—46.7)

This invention relates to lubricating compositions containing certain new compounds, their method of preparation, and to lubricating oil compositions comprising or containing the products thereof, namely, carbonyl-substituted alkyl phosphoroamidothioates, particularly phosphorodiamidodithioates.

In copending application Serial Number 630,088, filed December 24, 1956, certain formylalkyl thiophosphate esters are described which are prepared by the reaction of an O, O-diester of a dithiophosphoric acid with an alkenal such as acrolein, crotonaldehyde, 2-pentenal, etc. The reaction is carried out in such a manner that instead of condensation, wherein the alkenal serves to provide a linking nucleus between the thiophosphate esters, and the oxo group of the aldehyde is removed by the formation of water, the oxo group of the aldehyde reactant is retained in the reaction product to impart unusual properties thereto.

This invention is directed to the discovery that the reaction product of an amine with a phosphorus sulfide can be converted to a carbonylalkyl derivative by reaction with a carbonyl compound having α, β unsaturation. This application is a division of application Serial Number 696,604, filed November 15, 1957, now U.S. Patent 2,996,532.

It becomes, therefore, a primary object of this invention to provide oil-soluble, alkoxycarbonylalkyl phosphoroamido esters for use in lubricating oil compositions and a method of preparing same.

Another object of this invention is to provide oil-soluble, carbonyl-substituted phosphorodiamidodithioic esters for use as lubricating oil additives.

An additional object of this invention is to provide a lubricating oil additive having minimum deposit-forming properties which will enhance the load-carrying and anti-wear properties of a mineral lubricating oil.

A further object of this invention is to provide a lubricating oil composition having increased load-carrying and antiwear properties.

According to this invention, it has been found that the carbonyl-substituted phosphorodiamidodithioic esters of the general formula,

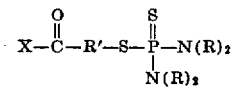

where R groups are hydrogen or alkyl groups containing 1 to 25 carbon atoms, or are aryl groups, alkylaryl or arylalkyl groups containing from 6 to 25 carbon atoms, R' is a divalent alkyl radical containing from 1 to 25 carbon atoms, and X is selected from the group of hydrogen, alkyl groups (including benzyl, methyl, ethyl, propyl, isopropyl, isobutyl, n-butyl, t-butyl, cyclohexyl, and octyl), and alkoxy, amino, alkylamino and dialkylamino groups, are useful as lubricating oil additives. Compounds meeting the foregoing general formula can be formed by the reaction of a phosphoroamido acid with an unsaturated carbonyl compound. In order that the invention may be clearly understood, the general reactants are described and specific examples given.

The phosphorodiamidodithioic acids are prepared by reacting primary or secondary amines with phosphorus pentasulfide. Useful amines include the methylamines, the ethylamines, aniline, m-benzylaniline, p-benzylaniline, benzylamine, propylamine, isopropylamine, dipropylamine, di-isopropylamine, butylamine, dibutylamine, isobutylamine, di-isobutylamine, amylamine, isoamylamine, p-isopropylaniline, dodecylamine, and the like. The reaction between primary or secondary amines and $P_2S_5$ results in phosphorodiamidodithioates which may be used as intermediates for preparing the subject compounds. Mixed diamides are obtained when dialkyl amines react with $P_2S_5$ at about 130° C.

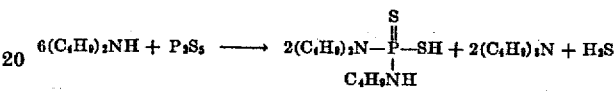

With primary amines, symmetrical diamides can be prepared. Aniline reacts with $P_2S_5$ at 30° C. to give N,N'-diphenyl-phosphorodiamidodithioic acid:

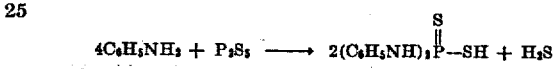

The products resulting from the reaction of the amine with $P_2S_5$, after separation and purification, or in their semi-pure state, are treated with an unsaturated conjugated carbonyl compound, of the following formula:

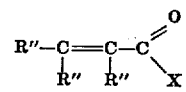

wherein X is a group as heretofore defined and R" may be hydrogen, $C_1$ to $C_8$ alkyl groups, including methyl, ethyl, propyl, butyl, isobutyl, pentyl, isopentyl, hexyl, heptyl and octyl, or combinations thereof. The alpha carbon atom may carry a hydrogen atom and the beta carbon atom may carry one or two alkyl groups, or the alpha carbon atom may carry an alkyl group and the beta carbon atom may carry one or two hydrogen atoms. Since X may be hydrogen, an alkyl group, alkoxy group or amino group, etc., the unsaturated conjugated carbonyl compounds included in this invention are of the class of unsaturated aldehydes, unsaturated ketones, unsaturated esters, and the unsaturated amides as general examples. The

group in the above formula, having an upper limit of 25 carbon atoms, becomes R' in the end product through the addition of the dithioic acid. Specific non-limiting examples of unsaturated carbonyl compounds coming within the foregoing general formula are:

| | |
|---|---|
| Acrolein | n-Butyl acrylate |
| Crotonaldehyde | Cyclohexyl acrylate |
| Beta-methylcrotonaldehyde | Ethyl acrylate |
| Alpha-methylcrotonaldehyde | Methyl acrylate |
| Alpha-methyl-beta-ethylacrolein | Octyl acrylate |
| Vinyl methyl ketone | Acrylamide |
| Vinyl ethyl ketone | N-t-butylacrylamide |
| Mesityl oxide | N,N-diethylacrylamide |
| Methyl methacrylate | 2-ethylhexyl acrylate |
| Benzyl acrylate | |

From the foregoing illustrations, it is apparent that X in the general formula may also include the methoxy, ethoxy, acetoxy, methylamino, ethylamino, dimethylamino and diethylamino groups as further specific examples.

In order to illustrate the invention, a number of nonlimiting examples are given:

EXAMPLE I

N,N'-tri-n-butylphosphorodiamidodithioic acid was prepared as follows: One hundred forty-seven g. (1.14 moles) of di-n-butylamine and 20.4 g. (0.092 mole) of phosphorus pentasulfide were charged to a 500 ml. flask equipment with a mercury-sealed stirrer, thermometer, and reflux condenser. As a reaction mixture was stirred, the temperature rose to 80° C. spontaneously, and heat supplied by a heating mantle brought the pot temperature to 160–165° C. The system was refluxed for three hours at this temperature. A white solid product started to form at 145° C. and its production appeared to be complete at the end of this period. The product was washed with methanol and dried. *Analysis.*—Calc'd for

$C_{12}H_{29}N_2PS_2$

N, 9.5%; P, 10.5%; S, 21.6%. Found: N, 9.3%; P, 10.3%; S, 19.8%. This product was found to increase the wear rate of a base oil in which it was blended and was therefore of no value as an antiwear additive.

EXAMPLE II

*2-Ethylhexyloxycarbonylethyl Ester of N,N'-Tri-n-Butylphosphorodiamidodithioate*

The product of Example I was converted to the 2-ethylhexyloxycarbonylethyl ester by addition to 2-ethylhexyl acrylate as follows: Twenty g. (0.07 mole) of the N,N'-tri-n-butylphosphorodiamidodithioic acid thus prepared, 18 g. (0.10 mole) of 2-ethylhexyl acrylate, and 200 ml. of toluene were charged to a 500 ml. flask equipped with a mercury-sealed stirrer, thermometer, reflux condenser, and heating mantle. The reaction mixture was stirred and refluxed with a pot temperature of 110–115° C. for twenty-four hours. At the end of this time the solution was completely clear. Under vacuum, the product was stripped with nitrogen to remove solvent. *Analysis of product.*—Calc'd for 86% concentrate of $C_{23}H_{49}N_2O_2PS_2$: N, 5.0 wt. percent; P, 5.5 wt. percent; S, 11.4 wt. percent. Found: N, 4.7 wt. percent; P, 5.1 wt. percent; S, 8.5 wt. percent.

EXAMPLE III

Exactly 142.4 grams (0.59 mole) of di-2-ethylhexylamine and 11.5 g. (0.052 mole) of phosphorus pentasulfide were charged to a 500 ml. flask equipped with heating mantle, motor-driven stirrer, and thermometer. Stirring was applied at once and there was some spontaneous generation of heat. Heat was applied by means of the mantle, and the temperature was raised to 180° C. The temperature was maintained in that range for 45 minutes as stirring continued. The product was a clear liquid with an acidity which indicated that 0.091 mole of acid had been formed (as against 0.104 mole in theory).

EXAMPLE IV

*Formylethyl N,N'-Tri-2-Ethylhexylphosphorodiamidodithioate*

Three-hundredths mole of the above acid was charged to a 500 ml. flask equipped with stirrer and a tube for delivering acrolein beneath the liquid surface. Then 18.5 g. (0.34 mole) of acrolein was distilled into the reaction mixture with stirring. There was some generation of heat and marked darkening of the color. The reaction was complete in an hour. The product was vacuum-nitrogen stripped. The product, formylethyl N,N'-tri-2-ethylhexylphosphorodiamidodithioate, could be expected to be diluted with amine and acrolein polymer since neither of these would be completely removed by the stripping employed. *Analysis.*—Calc. for $C_{26}H_{57}N_2OPS_2$: 5.4 wt. percent N, 6.0 wt. percent P, 12.3 wt. percent S. Found: 3.8 wt. percent N, 1.5 wt. percent P, 2.7 wt. percent S. The S/P/N ratio was 1.9/1/2.9; this indicates the excepted amine dilution, as theory would be 2/1/2.

EXAMPLE V

*N-t-Octylcarbamylethyl N,N'-Tri-n-Butylphosphorodiamidodithioate*

The N-t-octylcarbamylethyl N,N'-tri-n-butylphosphorodiamidodithioate ester of the acid from Example I, another representative compound of our invention, was prepared as follows: Exactly ten g. (0.034 mole) of the acid prepared above and 6.6 g. (0.036 mole) of N-t-octylacrylamide were charged, along with 200 ml. of toluene, to a 500 ml. flask equipped with sealed stirrer, thermometer and a reflux condenser. With heat supplied by a mantle, the reaction mixture was stirred and refluxed at 110° C. for 25 hours. The product was filtered and vacuum-nitrogen stripped. *Analysis of product.*—Calculated for $C_{23}H_{50}N_3OPS_2$: N, 8.8 wt. percent; P, 6.5 wt. percent; S, 13.4 wt. percent. Found: N, 7.2 wt. percent; P, 5.6 wt. percent; S, 9.7 wt. percent.

EXAMPLE VI

N,N-tricyclohexylphosphorodiamidodithioic acid was prepared as follows: 160.2 g. (0.88 mole) of dicyclohexylamine and 16.5 g. (0.074 mole) of $P_2S_5$ were charged to a 500 ml. flask equipped with thermometer, mechanical stirrer and heating mantle. The reaction mixture was stirred and heated. At about 80° C. a precipitate began to form. This coagulated as the reaction continued, making stirring very difficult. The reaction was suspended temporarily and the supernatant liquid poured off. The semisolid lower phase was removed and formed a glass-like solid on cooling. The supernatant liquid was returned to the flask and heated to 160° C. with stirring. The solid was pulverized and added at this temperature as stirring continued. After 15 minutes of reaction, the two-phase reaction product was separated while still hot. The lower phase cooled to a glass-like product, which was pulverized. The acid number of this material was 155, near to theoretical for N,N'-tricyclohexylphosphorodiamidodithioic acid, viz., 149.2. The analysis of this product was, calculated: 7.5 wt. percent N; 8.3 wt. percent P; 17.1 wt. percent S. Found: 5.0 wt. percent N; 8.1 wt. percent P; 14.2 wt. percent S.

EXAMPLE VII

*2-Ethylhexyloxycarbonylethyl N,N'-Tricyclohexylphosphorodiamidodithioate*

The above product was treated with a 1.6 molar portion of 2-ethylhexyl acrylate at 90° C. in toluene solution. A very slow reaction took place, and after 4 days a 60% yield of oil-soluble product was obtained by removal of the liquid phase and solvent stripping with nitrogen.

Although a number of organic phosphorus compounds have been proposed as antiwear additives for lubricating oils, the subject class of compounds has been found to be particularly effective in reducing wear between metal surfaces. In the following table is shown the results of wear tests on two kinds of lubricating blends. Base oil A was composed entirely of extract from manufacture of 85 vis., 100 V.I., neutral oil. Base oil B was composed of 4.8 wt. percent of the above extract, 5.7 wt. percent barium-calcium phenol sulfide-sulfonate detergent additive, 6.4 wt. percent of acrylic polymer (Acryloid #618) and 83.1 wt. percent 170 vis., 100 V.I., neutral oil.

Wear tests were carried out in triplicate on the four-ball E.P. machine in which the average wear-scar diameter was determined after a five-minute test at 1800 r.p.m., room temperature, 20 kg. load. The subject compounds are shown to be effective antiwear compounds compared to amine-$P_2S_5$ products before conversion to the carbonyl-substituted ester, or to a commercial metal phosphorodithioate.

TABLE I.—FOUR-BALL WEAR TESTS ON LUBRICATING OILS

[5 min., 20 kg., 1800 r.p.m., room temp. Phosphorus in blend, 0.10 wt. percent]

| Additive type | Additive description | Base oil | Avg. wear scar diam. |
|---|---|---|---|
| Products of this invention | Example II | B | 0.261 |
| | Example IV | A | 0.266 |
| | Example VII | A | 0.266 |
| | Example V | B | 0.272 |
| Amine-P₂S₅ products | Example III | B | 0.311 |
| | Example I | B | [1] 0.333 |
| | Example VI | A | [1] 0.486 |
| | Example I | A | [1] 0.546 |
| Commercial P-S ester | Zinc dialkyl phosphorodithioate | B | 0.278 |
| | None | A | 0.505 |
| | do | B | 0.280 |

[1] Lower phosphorous concentration in blend due to low solubility.

Wear-scar diameters are best interpreted by comparison with the diameter of elastic indentation of the balls under the test load. In the case of the tests at 20 kg. load, this diameter is 0.236 mm. and the increase in diameter above this value is an accurate measure of the wear under the test conditions. The above data show that mineral oil alone, or oils containing amine-$P_2S_5$ products of the phosphorodiamidodithioic acid type, allow relatively high wear rates. Although additives such as commercial phosphorodithioates and others, including those in base oil B, lower the wear rate substantially from that of mineral oil alone, the subject compounds give uniformly still lower wear rates in either base oil.

The foregoing examples describe the preparation and use of several carbonyl-substituted phosphoroamidodithioates coming within the broad definition of the invention. The species tested as represented by Examples II, IV, V and VII are the preferred embodiments of the invention.

Other examples include:

N-t-octylcarbamylethyl N',N''-tri-n-propylphosphorodiamidodithioate

N-hexylcarbamylethyl N',N''-tri-n-propylphosphorodiamidodithioate

N-diethylcarbamylethyl N',N''-tri-n-butylphosphorodiamidodithioate 2-ethylhexyloxycarbonylethyl N',N''-tri-n-butylphosphorodiamidodithioate N-t-octylcarbamylmethyl N',N''-tri-n-propylphosphorodiamidodithioate N-hexylcarbamylmethyl N',N''-tri-isopropylphosphorodiamidodithioate N-t-octylcarbamylethyl N',N''-tricyclohexylphosphorodiamidodithioate 2-acetylethyl N',N''-tri-ethyloctylphosphorodiamidodithioate Carbamylethyl N',N''-tri-n-octylphosphorodiamidodithiate N-t-octylcarbamylethyl N',N''-tetra-n-octylphosphorodiamidodithioate N-octadecylcarbamylethyl N',N''-tetra-n-propylphosphorodiamidodithioate N-pentacosylcarbamylethyl N',N''-tri-n-propylphosphorodiamidodithioate N-octadecylcarbamylethyl N',N''-tri-pentacosylphosphorodiamidodithioate N-dodecylcarbamylethyl N',N''-tri-heptadecylphosphorodiamidothioate These compounds represent the new and novel compositions of matter of this invention, whether present in a reaction mixture, or in semi-purified or purified form. These new compounds find particular use in lubricating oil compositions as antiwear agents. When used for this purpose, they may be incorporated in the oil in amounts ranging from about 0.1 to 5.0 weight percent. In some applications, less than 0.1 weight percent of the carbonyl-substituted phosphoroamidodithioates may be used and in others more than 5.0% by weight may be necessary or give better results. Some of these compounds have limited oil solubility but are effective when used in an amount sufficient to incorporate about 0.1 weight percent of phosphorus in the total composition. For applications where the appearance of the end composition is not important, the compounds of this invention may be used as suspensions in the oil-carrier or lubricity agent.

As indicated by the wear tests herein, other addends and ingredients may be used with the compounds of this invention, including various lubricating oil addends and different kinds of oil-carriers or lubricity agents. Thus, the compounds of this invention may be incorporated in any lubricating oil, cutting oil, extreme pressure lubricant, grease, aqueous-oil suspension, soluble oil and solid lubricant. The oil-carriers may be various lubricating oil fractions, bright stocks, neutrals or distillates. The addends of this invention may be used with synthetic lubricants. The following table gives the properties of various solvent extracts produced through the manufacture of bright stocks and neutral oils, by way of illustration. This table includes the properties of the specific solvent extract, number 19, used to prepare the formulations tested in Table I.

| Extract No. | Crude source | Solvent | API gravity | Sp. gr. at 60° F. | Vis./100° F. | Vis./130° F. | Vis./210° F. | V.I. | Pour | ° F. flask | ° F. fire | Iodine number (Wijs) | percent C.R. | percent sulfur |
|---|---|---|---|---|---|---|---|---|---|---|---|---|---|---|
| 1 | East Texas | Phenol | 11.1 | | 23,319 | 4,750 | 282 | | −40 | +55 | | | | 7.2 | 2.66 |
| 2 | do | do | 15.4 | | 15,000 | | 285 | | +39 | | | | | | |
| 3 | do | do | 12.6 | | 36,410 | 4,310 | 310.1 | | −1 | +80 | | | | 4.7 | 2.27 |
| 4 | do | do | 14.6 | | 19,500 | 4,305 | 313 | | +27 | +90 | | | | 4.7 | 2.2 |
| 5 | do | do | 15.4 | | 32,500 | | 372 | | +5 | +60 | | | | 4.13 | 2.33 |
| 6 | do | do | 13.7 | | 25,000 | 5,400 | 355 | | +27 | +80 | | | | | 2.18 |
| 7 | do | do | 8.6 | | 145,000 | 19,000 | 616 | | 0 | +70 | | | | | |
| 8 | do | do | 10.5 | | 12,676 | 2,514 | 172.1 | | −101 | +60 | | | | | 2.88 |
| 9 | Sante Fe Springs | do | 10.2 | 0.9984 | | | 371 | | | +65 | 520 | 600 | 69.4 | | |
| 10 | Texas | Furfural | 13.0 | 0.9791 | | | 1,500 | | | +85 | 470 | 515 | 57.1 | | |
| 11 | Pennsylvania | Chlorex | 12.2 | 0.9843 | | | 1,365 | | | +85 | 560 | 630 | 71.4 | | |
| 12 | do | Nitrobenzene | 10.0 | 1.000 | | | 1,500 | | | +75 | 555 | 640 | 60 | | |
| 13 | Mid-Continent | Propane-cresol | 14.4 | 0.9699 | | | 1,500 | | | +100 | 540 | 605 | 63.7 | | |
| 14 | do | Phenol | 13.6 | | | | 41.7 | | −82 | +20 | | | | | |
| 15 | do | Chlorex | 13.6 | | | | 200 | | −61 | +75 | | | | | |
| 16 | do | Phenol | 8.9 | | | | 569 | | | +75 | | | | | |
| 17 | do | Furfural | 14.9 | | | | 50.2 | | 25 | +20 | | | | | |
| 18 | East Texas | Phenol | 13.5 | .976 | 25,000 | | 341 | | 17 | +65 | 530 | 610 | | 5.76 | 2.36 |
| 19 | do | do | 17.6 | .949 | 157 | 81 | 40.7 | | −16 | +35 | 380 | 440 | | 0.25 | 1.96 |

The materials described in Table II are all prepared or derived through the solvent extraction of crude lubricating oils in the manufacture of refined oils, i.e., neutrals and bright stocks, as is well known in the art. These materials normally are considered waste products, being the extract phases derived during the solvent extraction and containing a predominance of the aromatic-type constituents as opposed to the paraffinic-type constituents which remain in the raffinate or refined oil. Solvent extracts are not as resistant to oxidation or sludging as the corresponding raffinates and have lower viscosity indices and higher viscosities than the raffinates. Accordingly, in using solvent extracts alone to prepare compositions containing the addends of this invention, these changes in properties must be taken into consideration as concerns their usefulness as a base oil.

Solvent extracts are obtained in the following manner, to give an illustration:

In a typical operation, desalted crude oil is first charged to a distillation unit where straight-run gasoline, two grades of naphtha, kerosene, and virgin distillate are taken off, leaving a reduced crude residue. The reduced crude is continuously charged to a vacuum distillation unit where three lubricating oil distillates are taken off as side streams, a light distillate is taken off as overhead, and a residuum is withdrawn from the bottom of the tower. This residuum is charged to a propane deasphalting unit wherein propane dissolves the desirable lubricating oil constituents and leaves the asphaltic materials. A typical vacuum residuum charge to the propane deasphalting unit may have an API gravity of 12.9°, viscosity SUS at 210° F. of 1249, flash 585° F., fire 650° F., C.R. of 13.9 weight percent and be black in color. The deasphalted oil may have an API gravity of 21.5° to 21.8°, viscosity SUS at 210° F. of 165–175, NPA color 6–7, flash 575° F., fire 640° F., and C.R. of 1.7–2.0. The deasphalted oil and various lubricating oil distillates from the reduced crude are separately subjected to solvent extraction for the separation of non-aromatic from aromatic constituents. The refined oil or "raffinate" from such processes is used per se or as blending stock and the solvent extract, containing predominantly aromatic constituents, is the material that may be used as a part of the base oil.

For example, a crude oil from East Texas with an API gravity of 33.1 was topped to remove such light fractions as gaoline, naphtha, kerosene, and a light lubricating distillate. The vacuum residue was a reduced crude having a viscosity of 1251 SUS at 210° F., 2.2 percent sulfur, and an API gravity of 12.6. After propane deasphalting, the oil had a viscosity of 174 SUS at 210° F., and an API gravity of 21.7. This deasphalted oil was treated with phenol to produce a raffinate from which an aviation lubricating oil may be produced. The extract phase from this phenol treatment, after removal of phenol, is ready for use in preparing compositions in accordance with this invention.

Other solvents than phenol may be used to obtain the extraction product used in accordance with this invention; for example, liquid sulfur dioxide, nitrobenzene, Chlorex, chlorophenol, trichloroethylene, cresylic acid, pyridine, furfural or the Duo-Sol solution comprising liquid propane and cresol may be used. When using phenol, it is possible to vary the characteristics of the extraction product considerably by adjustment of the amount of water present. A lower V.I. can be obtained by using a water solution of phenol during the extraction and a higher V.I. can be obtained by using anhydrous phenol.

The mineral lubricating oil bases which may constitute the whole or part of the carrier for the addends of this invention are derived from any paraffinic, naphthenic, or mixed-base crude oil source as Mid-Continent, Texas, California or Pennsylvania crude oil. Examples of lubricating oil bases are given in Table III.

TABLE III.—BASE OILS

| Mineral oil | API gravity | COC flash, °F. | COC fire, °F. | SUS at 100 °F. | SUS at 210 °F. | Vis. index | NPA color | Percent carbon residue | Percent sulfur | Stable pour, °F. |
|---|---|---|---|---|---|---|---|---|---|---|
| 100 vis. neutral | 33.6 | 405 | 450 | 103.2 | 39.7 | 101 | +2 | 0.00 | 0.12 | +5 |
| 70 vis. neutral | 36.6 | 370 | 405 | 71.3 | 36.9 | 111 | +1 | 0.00 | 0.18 | 0 |
| 150 bright stock | 26.8 | 570 | 630 | 2,511 | 156.0 | 99 | 6+ | 0.73 | 0.53 | −5 |
| 170 vis. neutral | 31.2 | 420 | 480 | 177.7 | 45.2 | 101 | 1+ | 0.00 | | 0 |

Other addends may be used in the compositions of this invention, including lubricity agents, pour depressants, V.I. improvers, oxidation inhibitors and the like. Acryloid #618 is the trade name of an acrylic acid polymer useful as a V.I. improver. This product is a well-known addend having a molecular weight of about 3000, a specific gravity of about 0.906 (60° F./60° F.), a flash point (C.O.C.) of about 400° F., a viscosity at 100° F. of about 8000 cs., neutralization No. of 0.2, and ASTM color of 3. The physical properties of other Acryloid lubricating oil additives are given in Table IV.

TABLE IV

| Property | Acryloid No. | |
|---|---|---|
| | 710 and 788 | 763 |
| Sp. gr., 60° F./60° F | 0.906 | 0.901 |
| Lbs./gal | 7.54 | 7.50 |
| Flash point, C.O.C., °F.[1] | 400 | 400 |
| ASTM, pour point, °F.[2] | +25 | +25 |
| Viscosity, cs./100° F | 9,400 | 7,200 |
| Viscosity, SUS/100° F | 43,000 | 33,000 |
| Viscosity, cs./210° F | 800 | 800 |
| Viscosity, SUS/210° F | 3,700 | 3,700 |
| Color, ASTM | 3 | 3 |
| Neut. number | 0.2 | 0.2 |

[1] When diluted with three parts of a 400° F. flash mineral oil to decrease the viscosity and prevent local overheating and cracking.
[2] Viscosity pour point.

The detergent-antioxidant that is included in the formulations tested herein is known under the trade name of Paranox 65. Broadly, addends of this type comprise about 65% by weight of a phenol sulfide salt and an alkaline earth metal sulfonate combination with about 35% mineral oil carrier. The active ingredients comprise about 80% by weight of a phenol sulfide salt and 20% of the sulfonate. As described in United States Patents 2,379,241 and 2,761,845, these anti-oxidant-detergents are oil-soluble metal salts of an alkylated hydroxy aryl sulfide mixed alkaline-earth metal petroleum sulfonates. The active ingredients in Paranox 65 comprise 65% of a mixture of barium salt of hydroxy diisobutyl phenyl sulfide and calcium petroleum sulfonate with a mineral oil, wherein the proportions of the sulfide salt to sulfonate are 80/20, as before stated. Paranox 65 has the following physical properties:

TABLE V.—TYPICAL PHYSICAL PROPERTIES OF PARANOX 65

| Physical characteristic: | Value |
|---|---|
| Viscosity at 210° F., SUS | 106.5 |
| Flash point, °F | 425 |
| Pour point, °F | 10 |
| Specific gravity, 60/60° F | 1.0136 |
| Weight, avg., lb./gal. at 60° F | 8.5 |
| Barium, weight percent | 7.73 |
| Calcium, weight percent | 0.6 |
| Sulfur, weight percent | 12.71 |
| Ash, weight percent | 14.9 |
| Sulfated ash, weight percent | 15.4 |
| Conradson carbon residue, weight percent | 16.7 |
| Neutralization number, ASTM | [1] 58 |
| Acid number | 2.3 |

[1] Base number.

What is claimed is:

1. A lubricating composition comprising a major amount of a mineral lubricating oil and about 0.1 to 5.0 weight percent of a carbonyl-substituted alkyl N,N'-trialkyl phosphorodiamidodithioate of the formula

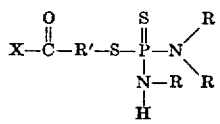

wherein R is an alkyl radical having 3 to 25 carbon atoms, R' is of the group consisting of methylene and ethylene, and X is of the group consisting of hydrogen, acetyl, amino, diethylamino, hexylamino, t-octylamino, dodecylamino, pentacosylamino, and 2-ethyl hexyloxy radicals.

2. A lubricating composition in accordance with claim 1 in which R' is a methylene group.

3. A lubricating composition in accordance with claim 1 in which R' is an ethylene group.

4. A lubricating composition in accordance with claim 1 in which X is hydrogen.

5. A lubricating composition in accordance with claim 1 in which X is acetyl.

6. A lubricating composition in accordance with claim 1 in which X is a 2-ethylhexyloxy group.

7. A lubricating composition in accordance with claim 1 in which X is an amino group.

8. A lubricating composition in accordance with claim 1 in which X is a t-octylamino group.

9. A lubricating composition in accordance with claim 1 in which X is a diethylamino group.

10. A lubricating composition comprising a major amount of a mineral lubricating oil and about 0.1 to 5.0 weight percent of 2-ethylhexyloxycarbonyl-ethyl-N,N'-trialkylphosphorodiamidodithioates wherein the alkyl radicals have from 3 to 25 carbon atoms.

11. A lubricating composition comprising a major amount of a mineral lubricating oil and about 0.1 to 5.0 weight percent of 2-ethylhexyloxycarbonyl-methyl-N,N'-trialkylphosphorodiamidodithioates wherein the alkyl radicals have from 3 to 25 carbon atoms.

12. A lubricating composition comprising a major amount of a mineral lubricating oil and about 0.1 to 5.0 weight percent of formylethyl-N,N'-trialkyl-phosphorodiamidodithioates wherein the alkyl radicals have from 3 to 25 carbon atoms.

13. A lubricating composition comprising a major amount of a mineral lubricating oil and about 0.1 to 5.0 weight percent of formylmethyl-N,N'-trialkylphosphorodiamidodithioates wherein the alkyl radicals have from 3 to 25 carbon atoms.

14. A lubricating composition comprising a major amount of a mineral lubricating oil and about 0.1 to 5.0 weight percent of N-t-octylcarbamylethyl-N,N'-trialkylphosphorodiamidodithioates wherein the alkyl radicals have from 3 to 25 carbon atoms.

15. A lubricating composition comprising a major amount of a mineral lubricating oil and about 0.1 to 5.0 weight percent of N-t-octylcarbamylmethyl-N,N'-trialkylphosphorodiamidodithioates wherein the alkyl radicals have from 3 to 25 carbon atoms.

16. A lubricating composition comprising a major amount of a mineral lubricating oil and about 0.1 to 5.0 weight percent of 2-ethylhexyloxycarbonylethyl-N,N'-tricycloalkylphosphorodiamidodithioates wherein the tricycloalkyl radicals have from 3 to 25 carbon atoms.

17. A lubricating composition comprising a major amount of a mineral lubricating oil and about 0.1 to 5.0 weight percent of 2-ethylhexyloxycarbonylmethyl-N,N' - tricycloalkylphosphorodiamidodithioates wherein the tricycloalkyl radicals have from 3 to 25 carbon atoms.

18. A lubricating composition comprising a major amount of a mineral lubricating oil and about 0.1 to 5.0 weight percent of N-t-octylcarbamylmethyl-N,N'-tri-n-propylphosphorodiamidodithioate.

19. A lubricating composition comprising a major amount of a mineral lubricating oil and about 0.1 to 5.0 weight percent of 2-ethylhexyloxycarbonylethyl-N,N'-tricyclohexylphosphorodiamidodithioate.

20. A lubricating composition comprising a major amount of a mineral lubricating oil and about 0.1 to 5.0 weight percent of 2-ethylhexyloxy carbonylethyl-N,N'-tri-n-butylphosphorodiamidodithioate.

21. A lubricating composition comprising a major amount of a mineral lubricating oil and about 0.1 to 5.0 weight percent of formylethyl-N,N'-tri-2-ethylhexylphosphorodiamidodithioate.

22. A lubricating composition comprising a major amount of a mineral lubricating oil and about 0.1 to 5.0 weight percent of N-t-octylcarbamylethyl-N',N''-tri-n-butylphosphorodiamidodithioate.

References Cited in the file of this patent

UNITED STATES PATENTS

| 2,146,584 | Lipkin | Feb. 7, 1939 |
| 2,760,957 | Adelson | Aug. 28, 1956 |
| 2,881,201 | Schrader | Apr. 7, 1959 |

UNITED STATES PATENT OFFICE
CERTIFICATE OF CORRECTION

Patent No. 3,098,824            July 23, 1963

Allen F. Millikan et al.

It is hereby certified that error appears in the above numbered patent requiring correction and that the said Letters Patent should read as corrected below.

Column 3, line 22, for "10,5%" read -- 10.5% --; columns 5 and 6, insert as a heading for the table at the bottom of the page:

TABLE II
SOURCES AND PHYSICAL CHARACTERISTICS OF SOLVENT EXTRACTS column 8, line 69, after "mixed" insert -- with --.

Signed and sealed this 3rd day of March 1964.

(SEAL)
Attest:

ERNEST W. SWIDER            EDWIN L. REYNOLDS

Attesting Officer            Acting Commissioner of Patents